United States Patent [19]
Murphy

[11] Patent Number: 4,880,384
[45] Date of Patent: Nov. 14, 1989

[54] BRAILLE TEACHING APPARATUS

[76] Inventor: Kevin C. Murphy, 97 Forrest St., Plaistow, N.H. 03865-1810

[21] Appl. No.: 305,774

[22] Filed: Feb. 3, 1989

[51] Int. Cl.$^4$ ............................................. G09B 21/00
[52] U.S. Cl. .................................... 434/113; 446/128
[58] Field of Search ............... 434/113, 200, 208, 195, 434/196; 446/128

[56] References Cited

U.S. PATENT DOCUMENTS

| | | | |
|---|---|---|---|
| 1,668,328 | 5/1928 | Martien | 434/113 |
| 2,456,155 | 12/1948 | Seaman | 434/113 |
| 3,005,282 | 10/1961 | Christiansen | 446/128 |
| 3,414,986 | 12/1968 | Stassen | 434/195 |

Primary Examiner—William H. Grieb
Attorney, Agent, or Firm—Richard C. Litman

[57] ABSTRACT

An apparatus for teaching Braille letters, words and sentence structure is disclosed. The present invention provides the construction of a number of blocks, each containing the appropriate dot arrangement on its surface to represent a Braille character, sound, word, or number. The Braille blocks are similar in construction to a two by three matrix Lego TM brand building block. However, the two by three matrix of dots is altered such that the dots on a block are representative of a Braille character. The present invention also involves the structure of a rigid board upon which the Braille blocks may be affixed. This board allows for the creation of words and sentences upon its surface. The board also prevents the inadvertent jumbling of the blocks placed upon it such that a tutorial lesson is not interrupted by any disturbances. This feature is particularly important when one is teaching the young or the retarded to read Braille.

7 Claims, 2 Drawing Sheets

BRAILLE TEACHING APPARATUS

BACKGROUND OF THE INVENTION

1. Field of the Invention

The present invention relates to the teaching of Braille to blind persons. More specifically, the present invention relates to an apparatus that allows the teaching of the Braille dot matrix structure and word and sentence formation through the use of blocks that resemble Lego TM brand building blocks.

2. Description of the Prior Art

There have been a few devices invented in the past that help to teach Braille to the blind. However, these systems fail to provide a simple arrangement of parts that allows for the teaching of word recognition and sentence structure. Most of the devices that have been developed have focused on the teaching of individual letters by teaching the Braille dot matrix representations of alphanumeric characters.

Inventions such as that disclosed in U.S. Pat. No. 2,456,155 issued to Seaman is a successful teaching device. The Seaman invention is a board that can accept posts in the locations of the Braille dots. Through repeated contact with Braille dot arrangements, the blind learn how to recognize and read letters and eventually words. However, a difficulty arises when one tries to teach a young or retarded individual. With both types of individuals, an appropriate method for teaching the fundamentals of word and sentence structure has heretofore been elusive. For the most part, illiterate individuals have had to learn the hard way. They have had to learn first to spell, then to form sentences using texts where the Braille dot letters are small and difficult to read to the Braille novice.

Because of the difficulties encountered in learning full text reading, youngsters and retarded individuals have the tendency to become frustrated by attempts to teach Braille. They may throw fits of rage or frustration. In a teaching system where the letters are not fixed to either the paper or some other surface, a fit that jumbles the letters can destroy hours of tutorial work.

The present invention recognizes an advantage to a system of teaching where the letters could be fixed to a rigid surface. It also recognizes the usefulness of oversized letters in the teaching of sentence structure to those not yet proficient in the reading of small-type Braille. Therefore, the present invention recognizes an alternative use to a modification of the Lego TM brand building block for use in training individuals to read Braille.

Lego TM brand building blocks, in their most recognizable form resemble rectangular blocks with raised dots. The underside of the building block contains cylindrical members that allow the attachment of one block to another. U.S. Pat. No. 3,005,282 issued to G. K. Christiansen on Oct. 24, 1961 discloses the structure of Lego TM brand building blocks. A similar structure to these blocks is used in the present invention.

However, the present invention requires the modification of the Lego TM building block. Braille characters constitute raised dots in a two by three matrix. In order to represent various letters and characters and their respective derivations, the dots are arranged in specific patterns. Thus, by the removal of appropriate dots from the surface of a standard six-dot Lego TM building block, an entire Braille alphabet can be constructed. By arranging the blocks appropriately, words and sentences are formed. Clearly the removal of raised dots from the surface of the block takes away the self-attachable characteristic of the Lego TM building block. However, this feature is not part of the present invention.

The Braille letter blocks can be arranged loosely on a surface such that they form words and sentences. However, the same Lego TM concept can be used for a rigid board by creating a raised dot surface capable of accepting the Braille blocks. When placed upon the rigid board, the letter blocks will remain relatively fixed to the surface. Therefore, any jostling, whether intentional or not, will not disrupt the teaching session by destroying the teaching materials as arranged.

SUMMARY OF THE INVENTION

Therefore, it is an object of the present invention to provide a new and useful apparatus for teaching the Braille alphabet to the blind.

It is a further object of the present invention to provide a new and useful apparatus for teaching word formation and sentence structure through Braille to the blind.

It is yet another object of the present invention to provide a means to teach math to the blind.

It is still a further object of the present invention to provide a collection of the letters and letter arrangements available in the Braille system such that these individual representations can be arranged to form words and sentences.

It is another object of the present invention both to provide a rigid board upon which the Braille blocks can be fixed for the ease of reading the blocks as arranged and to provide a means to hold the blocks fixed in their respective arrangement such that they cannot be easily moved if jostled. This prevents the need to reconstruct words and sentences if the blocks are scrambled by a frustrated individual.

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

Similar reference characters designate corresponding parts throughout the various figures of the drawings.

DESCRIPTION OF THE PREFERRED EMBODIMENT

Figure 2:
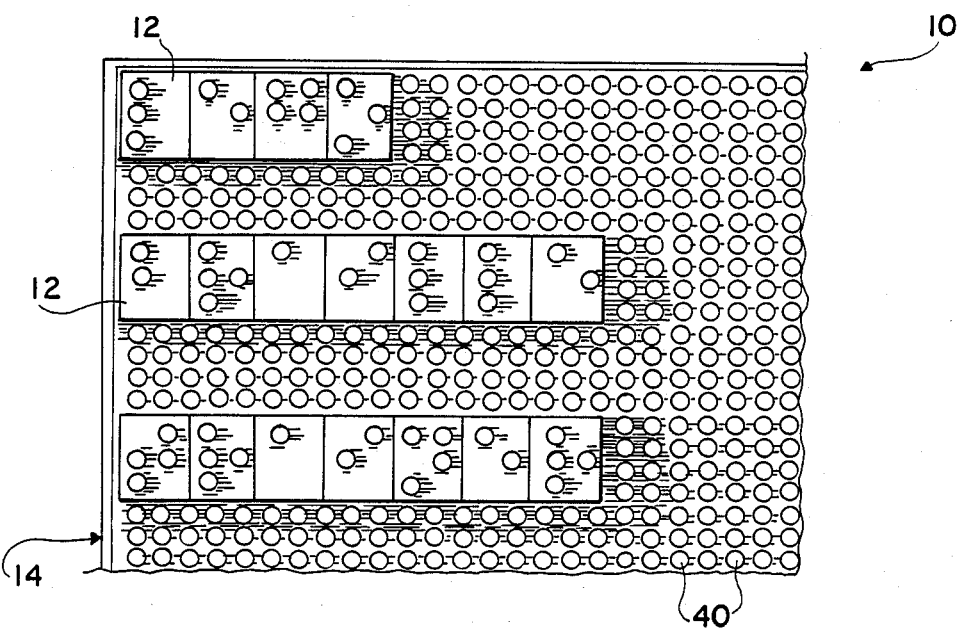
FIG. 2 is a top view of an arrangement of Braille blocks upon the rigid building surface.

The present invention of a Braille teaching apparatus is generally designated by 10 in FIG. 2. The Braille blocks 12 are designated by their respective alphabetical characters and sound representations. The following is a list of the blocks designated, however, it is not an exclusive list of Braille blocks 12 possible: A, B, C, D, E, F, G, H, I, J, K, L, M, N, O, P, Q, R, S, T, U, V, W, X, Y, Z, CH, GH, SH, TH, WH, ED, ER, AND, FOR, OF, THE, WITH, OU, and OW.

Figure 1:
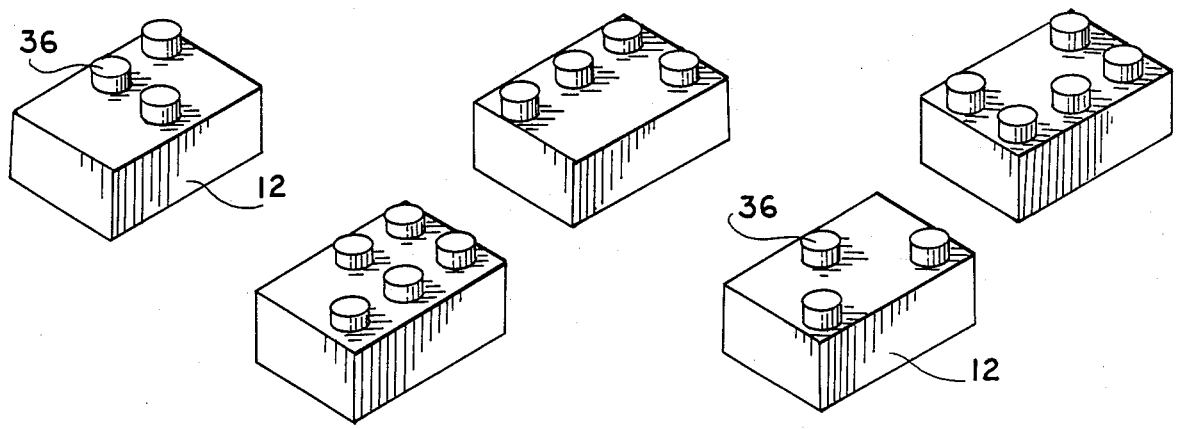
FIG. 1 is a perspective illustration of the types of Braille blocks that could be constructed in accordance with the present invention. The basic Braille alphabet is shown.

The Braille blocks 12 are constructed in the same manner as the original Lego TM brand building blocks. The Braille block 12 has four sides 30 and a top 32. The top 32 contains a maximum number of six raised dots 36 arranged in a two by three matrix on its surface. Each raised dot 36 is substantially a cylindrical protrusion with a flat crown. However, the raised dots 36 may be cylindrical with a rounded crown. The raised dots 36 may even have the appearance of a hemisphere. Regardless of the shape of the raised dots 36, they must be thick enough in height and width to be felt by the human hand. As may be apparent from FIG. 1, the dots can be arranged in any number of patterns with each pattern representing a different letter, sound, or common word.

Figure 3:
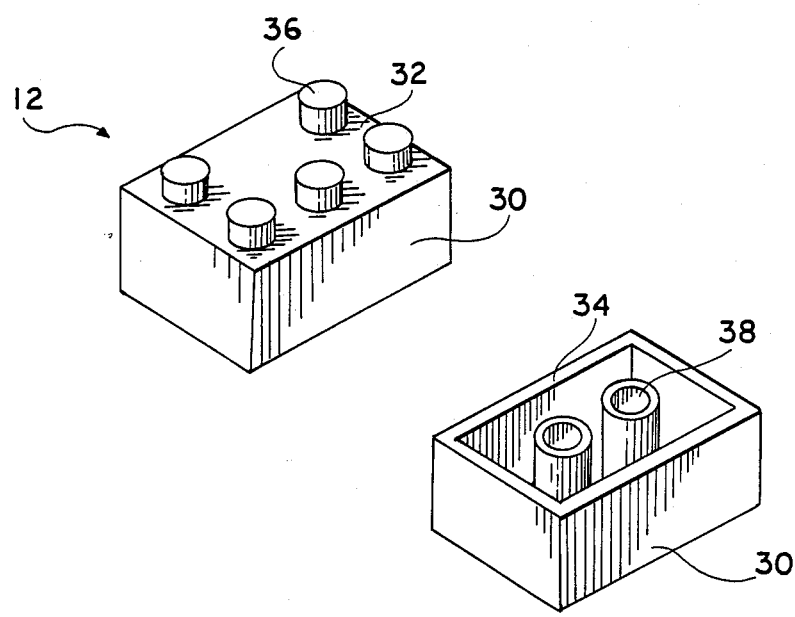
FIG. 3 is an enlarged perspective illustration of a single Braille block of the letter "Y" from both the top and the bottom showing the appropriate structural features.
Figure 4:
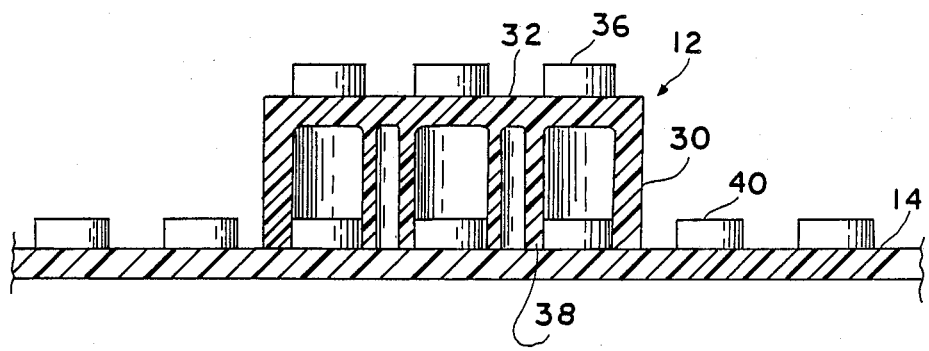
FIG. 4 is a cross-sectional illustration of the present invention showing one of the Braille blocks removably attached to the rigid surface.

The top 32 of the Braille block 12, as shown in FIG. 3, has at least one, preferably two, cylindrical protrusions 38 extending from its underside. The underside of the top 32 is simply the planar reverse of the surface of the top 32 from which the raised dots 36 protrude. The cylindrical protrusions of the Braille block 12 are designed such that they extend from the underside of the top 32 to the bottom edge 34 of the Braille block 12. The cylindrical protrusions function to pin the protrusions 40 from the rigid surface 14 between them and the sides 30 of the Braille block 12. Thus, when the Braille block 12 is pressed onto the rigid surface 14, the protrusions 40 from the rigid surface 14 become wedged between the cylindrical protrusions 38 and the sides 30 of the Braille block 12. This arrangement allows the Braille blocks 12 to remain fixed to the rigid surface 14 without moving. However, the protrusions 40 also allow for the removal of the Braille blocks 12 from the rigid surface 14, because the Braille blocks 12 are not strongly wedged into position. As a result, the Braille blocks 12 may be reused in a new arrangement.

FIG. 2 shows the way in which the blocks may be arranged upon the rigid surface 14. The rigid surface 14 is provided with a regular pattern of protrusions 40 in a rectilinear pattern. The protrusions 40 are cylindrical having a flat crown. These protrusions 40 are arranged such that when a Braille block 12 is placed upon the surface, it becomes removably attached to the rigid surface 14. The Braille blocks 12 can be arranged to form words and sentences.

In addition to the alphabetical use of the present invention, the Braille blocks 12 can be used to teach the blind mathematical constructions. The most obvious of the mathematical uses would be for addition. The Braille blocks 12 containing numbers could be straddled in the usual fashion on the rigid surface 14. By feeling the numbers in columnar form, the blind can add the numbers and return the appropriate digit after the summation sign. The same methodology could be adapted for any mathematical construction that can be adapted to Braille block 12 use.

It is to be understood that the present invention is not limited to the sole embodiment described above, but encompasses any and all embodiments within the scope of the following claims.

I claim:

1. A Braille teaching apparatus comprising:
a plurality of Braille blocks containing from one to six raised dots in a pattern indicative of a Braille alphanumeric character,
a rigid board means,
said rigid board means having a top edge and a bottom edge,
wherein said Braille blocks being placed in a specific alignment with respect to said top edge of said rigid board means allowing for comprehension of the symbolic meaning of said Braille blocks so placed,
wherein said Braille blocks being placed on said rigid board means in close proximity to one another forming phonetic and mathematical sentences,
wherein said Braille blocks comprise a body having the shape of a rectangular parallelopiped,
said body comprising four sides, and a top,
said top having a bottom surface and a top surface,
said sides and said top attaching to one another such that each of said sides being perpendicular to the next and perpendicular to said top,
said bottom surface of said top having at least one cylindrical member extending therefrom to the bottom edge of said Braille block allowing for attachment of said Braille block to said rigid board means,
said top surface of said top of said Braille blocks having said raised dots disposed thereon,
said rigid board means having a top surface and a bottom surface,
said top surface of said rigid board means being covered by a plurality of protrusions in a regular rectilinear pattern allowing for fixed acceptance of said Braille blocks thereupon with said cylindrical members tightly disposed between said protrusions,
said rigid board means holding said Braille blocks preventing inadvertent removal by any sudden action of an individual, and
the combination of said Braille blocks and said rigid board means being usable as an instructor of individuals having disabilities in addition to blindness.

2. A Braille teaching apparatus according to claim 1, wherein:
said bottom surface of said top containing two cylindrical members extending therefrom.

3. A method for teaching Braille using the Braille blocks according to claim 1 wherein,
said Braille blocks can be arranged individually on said top surface of said rigid board means allowing for the teaching and learning of the various dot matrix representations of characters, numbers, sounds, and words provided by the Braille system.

4. A method for teaching Braille using the Braille blocks according to claim 1 wherein,
said Braille blocks can be arranged on said top surface of said rigid board means next to one another and in sequences allowing for the spelling of words and the teaching thereof.

5. A method for teaching Braille using the Braille blocks according to claim 1 wherein,
said Braille blocks can be arranged on said top surface of said rigid board means next to one another with appropriate spacing allowing for the formation of sentences and the teaching thereof.

6. A method for teaching mathematical constructions using the Braille blocks according to claim 1 wherein,
said Braille blocks can be arranged on said top surface of said rigid board means next to one another and in appropriate mathematical form allowing for the formation of mathematical sentences and the teaching thereof.

7. A method for fabricating the Braille blocks according to claim 1 wherein,
a standard two by three matrix Lego ™ has some of said raised dots removed from said top such that the remaining of said raised dots form letters, numbers, sounds, or words as provided by the Braille system.

* * * * *